United States Patent
Toner et al.

(10) Patent No.: US 9,036,803 B2
(45) Date of Patent: *May 19, 2015

(54) SYSTEM AND METHOD FOR PROVIDING ADVANCED CALL FORWARDING FUNCTIONALITY

(71) Applicant: CenturyLink Intellectual Property LLC, Denver, CO (US)

(72) Inventors: Victoria M. Toner, Platte City, MO (US); Johnny Hawkins, Kansas City, MO (US); Rich Schermerhorn, Overland Park, KS (US); Shekhar Gupta, Overland Park, KS (US); Mike A. Roberts, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,846

(22) Filed: Jun. 4, 2013

(65) Prior Publication Data

US 2013/0273896 A1  Oct. 17, 2013

Related U.S. Application Data

(63) Continuation of application No. 13/445,694, filed on Apr. 12, 2012, now Pat. No. 8,462,932, which is a continuation of application No. 12/146,118, filed on Jun. 25, 2008, now Pat. No. 8,175,246.

(51) Int. Cl.
*H04M 3/42* (2006.01)
*H04W 4/16* (2009.01)
*H04M 1/725* (2006.01)

(52) U.S. Cl.
CPC ............ *H04W 4/16* (2013.01); *H04M 3/42263* (2013.01); *H04M 1/72513* (2013.01); *H04M 2203/1091* (2013.01); *H04M 2242/30* (2013.01); *H04M 2250/10* (2013.01)

(58) Field of Classification Search
USPC ...................................... 379/211.02; 455/440
See application file for complete search history.

(56) References Cited

U.S. PATENT DOCUMENTS

| | | | |
|---|---|---|---|
| 5,559,859 | A | 9/1996 | Dai et al. |
| 5,619,556 | A | 4/1997 | Richardson et al. |
| 6,363,248 | B1 | 3/2002 | Silverman |
| 6,584,316 | B1 | 6/2003 | Akhteruzzaman et al. |
| 6,856,806 | B1 | 2/2005 | Bosik et al. |

(Continued)

OTHER PUBLICATIONS

U.S. No. 12/146,118; Issue Notification dated Apr. 18, 2012; 1 page.

(Continued)

*Primary Examiner* — Creighton Smith
(74) *Attorney, Agent, or Firm* — Swanson & Bratschun, L.L.C.

(57) ABSTRACT

The disclosed embodiments include a method of determining a particular communications device to signal in order to contact a user. The method includes storing a plurality of device locations in memory. The method includes determining a current location of a user or user device in response to receiving a communication request, comparing the received current location and one or more of the device locations, and selecting a particular communications device to route the communication request. A distinctive call forwarded ring signal may be sent to the particular communications device in order to indicate to the user that the call is intended for the user.

19 Claims, 5 Drawing Sheets

(56) References Cited

U.S. PATENT DOCUMENTS

| | | |
|---|---|---|
| 6,975,874 B1 | 12/2005 | Bates et al. |
| 6,999,757 B2 | 2/2006 | Bates et al. |
| 7,082,192 B2 | 7/2006 | Weaver at al. |
| 7,103,366 B2 | 9/2006 | Bates et al. |
| 7,130,643 B2 | 10/2006 | Bates et al. |
| 7,243,123 B1 * | 7/2007 | Allen et al. ............. 709/204 |
| 7,251,494 B2 | 7/2007 | Bates et al. |
| 8,175,246 B2 * | 5/2012 | Toner et al. ............. 379/211.02 |
| 8,462,932 B2 | 6/2013 | Toner et al. |
| 8,798,603 B2 | 8/2014 | Hawkins et al. |
| 2003/0134648 A1 | 7/2003 | Reed et al. |
| 2004/0234056 A1 | 11/2004 | Heilmann et al. |
| 2005/0009524 A1 | 1/2005 | Garani et al. |
| 2007/0003026 A1 | 1/2007 | Hodge et al. |
| 2008/0064375 A1 | 3/2008 | Gottlieb |
| 2008/0081638 A1 | 4/2008 | Boland et al. |
| 2009/0323919 A1 | 12/2009 | Toner et al. |
| 2010/0240343 A1 | 9/2010 | Russell |
| 2012/0196606 A1 | 8/2012 | Toner et al. |

OTHER PUBLICATIONS

U.S. Appl. No. 12/146,118; Non-Final Rejection dated Sep. 14, 2011; 5 pages.

U.S. Appl. No. 12/146,118; Notice of Allowance dated Jan. 9, 2012; 7 pages.

U.S. Appl. No. 12/172,772; Final Office Action dated Mar. 12, 2012; 13 pages.

U.S. Appl. No. 12/172,772; Final Rejection dated Apr. 11, 2013; 16 pages.

U.S. Appl. No. 12/172,772; Issue Notification dated Jul, 16, 2014; 1 page.

U.S. Appl. No. 12/172,772; Non-Final Office Action dated Mar. 31, 2011; 12 pages.

U.S. Appl. No. 12/172,772; Non-Final Office Action dated Jul. 11, 2012; 18 pages.

U.S. Appl. No. 12/172,772; Non-Final Office Action dated Oct. 9, 2013; 15 pages.

U.S. Appl. No. 12/172,772; Non-Final Rejection dated Dec. 6, 2012; 17 pages.

U.S. Appl. No. 12/172,772; Notice of Allowance dated Mar. 20, 2014; 18 pages.

U.S. Appl. No. 13/445,694; Issue Notification dated May 22, 2013; 1 page.

U.S. Appl. No. 13/445,694; Non-Final Rejection dated Jan. 15, 2013; 10 pages.

U.S. Appl. No. 13/445,694; Notice of Allowance dated Feb. 13, 2013; 10 pages.

* cited by examiner

| Addr: | http://www.registerorganizationtelephones.com | ▼ |

Company Name: Raytheon Company ▼ — 502

Company ID: 1742956 — 504

506 —

| Telephone Number | GPS Latitude | GPS Longitude | Name | Office |
|---|---|---|---|---|
| 978-858-4005 | 27.729523 | -92.352901 | T. MALAY | 8321 |
| 978-858-2704 | 27.729524 | -92.352900 | I. WIGDOR | 8324 |
| 978-858-2726 | 27.729525 | -92.352902 | L. FARRELL | 8328 |
| ... | ... | ... | ... | ... |
| 520-625-9302 | 32.216702 | -110.970901 | B. SMITH | 7201 |
| 520-625-9423 | 32.216703 | -110.970901 | N. JENKENS | 7202 |
| 520-625-9216 | 32.216703 | -110.970902 | T. BOGGS | 7204 |

508, 510

Submit

RING: SHORT-LONG ▼ — 512

FIG. 5

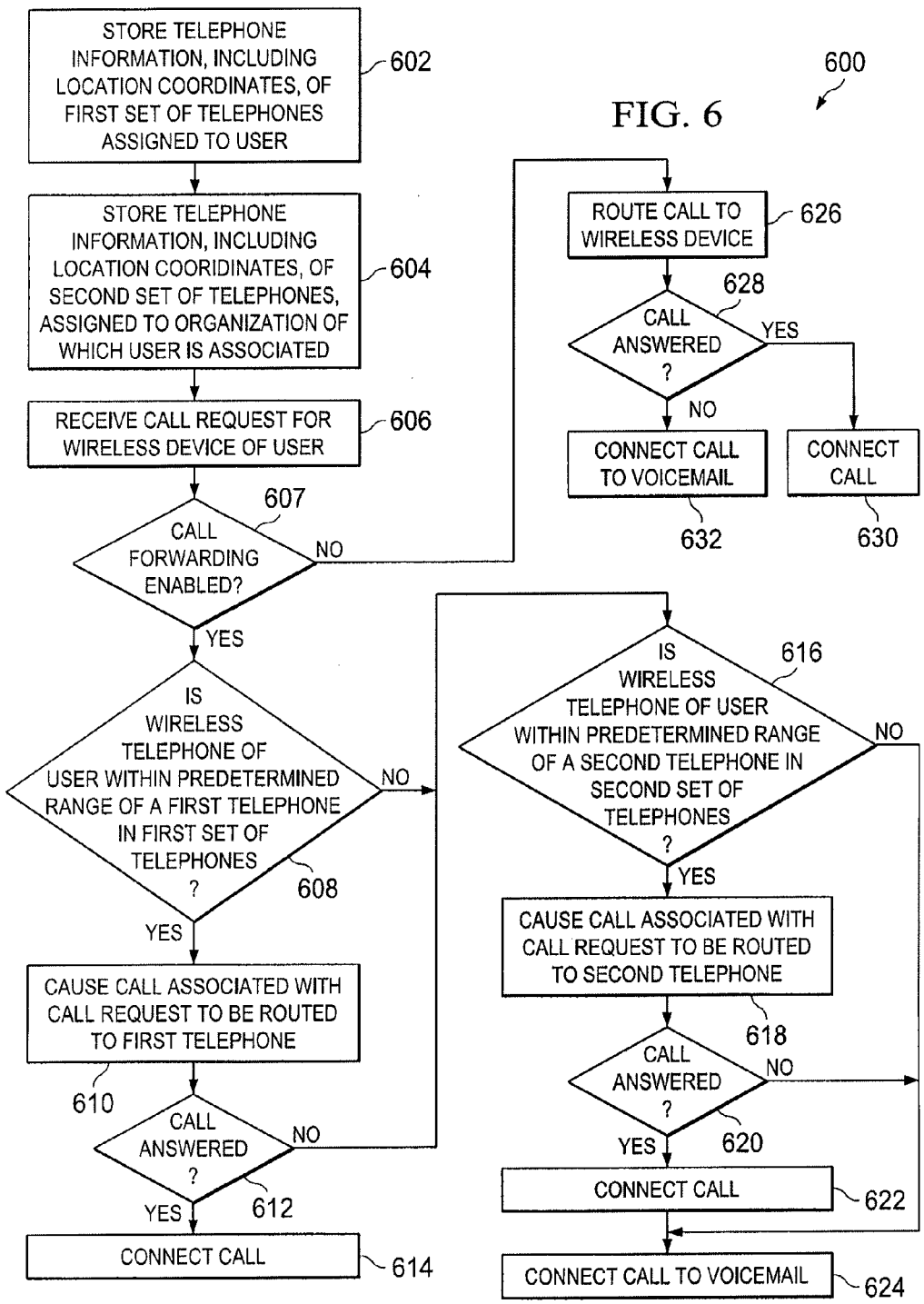

SYSTEM AND METHOD FOR PROVIDING ADVANCED CALL FORWARDING FUNCTIONALITY

CROSS REFERENCE TO RELATED APPLICATION

This application is a Continuation of U.S. patent application Ser. No. 13/445,694, filed on Apr. 12, 2012, which is a Continuation of U.S. patent application Ser. No. 12/146,118 filed on Jun. 25, 2008, now U.S. Pat. No. 8,175,246, the entire teachings of which are incorporated herein by reference.

BACKGROUND OF THE INVENTION

Telecommunications have advanced dramatically over the past few years. Mobile telecommunications have adopted a number of different technologies into mobile telephones, including cameras, speech recognition, and global positioning systems (GPS), to name a few. With each of these technologies, applications have been developed to utilize the technologies. In addition to mobile telephones, voice over Internet Protocol (VoIP) telecommunications have been developed and had a variety of technologies and applications developed therefor.

Two applications or services that have been developed for mobile and VoIP telecommunications are "smart simultaneous ring" and "find me follow me." The "find me follow me" application is two call forwarding applications that are often used in conjunction with one another. The "find me" application allows a user to receive calls at any location, and the "follow me" application allows a user to receive calls at any number of telephone numbers. The "simultaneous ring" application rings several telephone numbers simultaneously when a call is received at a first telephone, such as a mobile telephone, and the "simultaneous ring" application is activated.

With each of these two applications, a user establishes telephone numbers for calls to be forwarded. For the "find me follow me" service, a user establishes his or her schedule in addition to the telephone numbers to efficiently call alternative telephone numbers at which a user anticipates being located. The two applications are generally used to reduce usage charges of customers as mobile telephone charges are generally based on usage time, while home telephone charges generally are not when calls are received.

SUMMARY OF THE INVENTION

To reduce cumbersome operation of existing "find me follow me" applications, the principles of the present invention provide for utilizing GPS capabilities of a wireless telephone to automatically determine a telephone number at which a user is currently located. To establish telephone numbers at which a user may be located in associated with respective GPS coordinates, a user may pre-establish telephone numbers in association with GPS coordinates so that a telecommunications system, in identifying a telephone number at which the user is located, may look-up the telephone number in association with the current GPS location of the user and call that telephone number. In addition, because users of wireless telephones often carry their wireless telephones at work and tend to walk around work premises and with team members in different offices, an office GPS-telephone number database may be established to enable a communications service provider to look-up a telephone number database. Furthermore, a distinctive ring may be established for a user such that a call to a different telephone may generate the distinctive ring to notify the user that the call is for him or her.

The disclosed embodiments include a method of determining a particular communications device to signal in order to contact a user associated with an organization. The method includes storing a set of locations corresponding to a set of communication devices. The method includes determining a current location of a communication device associated with a user in response to receiving a call request to the communication device, determining a closest communication device in the set of communication devices to the location of the communication device, and routing the call request to the closest communication device in the set of communication devices. The method may further include routing the call request to the closest communication device in the set of communication devices only in response to a determination that the closest communication device in the set of communication devices is within a predetermined range of the communication device at the time of receiving the call request to the communication device. The method may further include sending a distinctive call forwarded ring signal to the closest communication device in order indicate to the user that the call request has been routed from the communication device to the closest communication device in the set of communication devices.

The disclosed embodiments also include a system for providing communication services. The system includes a data storage unit that stores a set of location coordinates corresponding to a set of communication devices. The system has memory that stores executable instructions and a processor that executes the executable instructions to associate the set of communication devices with a communication device of a user. The system determines a location of the communication device and a closest communication device in the set of communication devices to the location of the communication device in response to receiving a call request to the communication device. The system then routes the call request to the closest communication device in the set of communication devices.

Still, the disclosed embodiments include a non-transitory, tangible computer readable medium comprising executable instructions for providing communication services. In one embodiment, the executable instructions include instructions for associating a set of communication devices with a user; determining a location of the user in response to receiving a call request to the user; determining a closest communication device in the set of communication devices to the location of the user; and routing the call request to the closest communication device in the set of communication devices.

Additional embodiments, advantages, and novel features are set forth in the detailed description.

BRIEF DESCRIPTION OF THE DRAWINGS

FIG. 5 is an illustration of an exemplary graphical user interface for a user to enter information of multiple telephones with location coordinates respectively associated therewith; and FIG. 6 is an exemplary flow diagram for providing call forwarding features in accordance with the principles of the present invention.

DETAILED DESCRIPTION OF THE DRAWINGS

Figure 1:
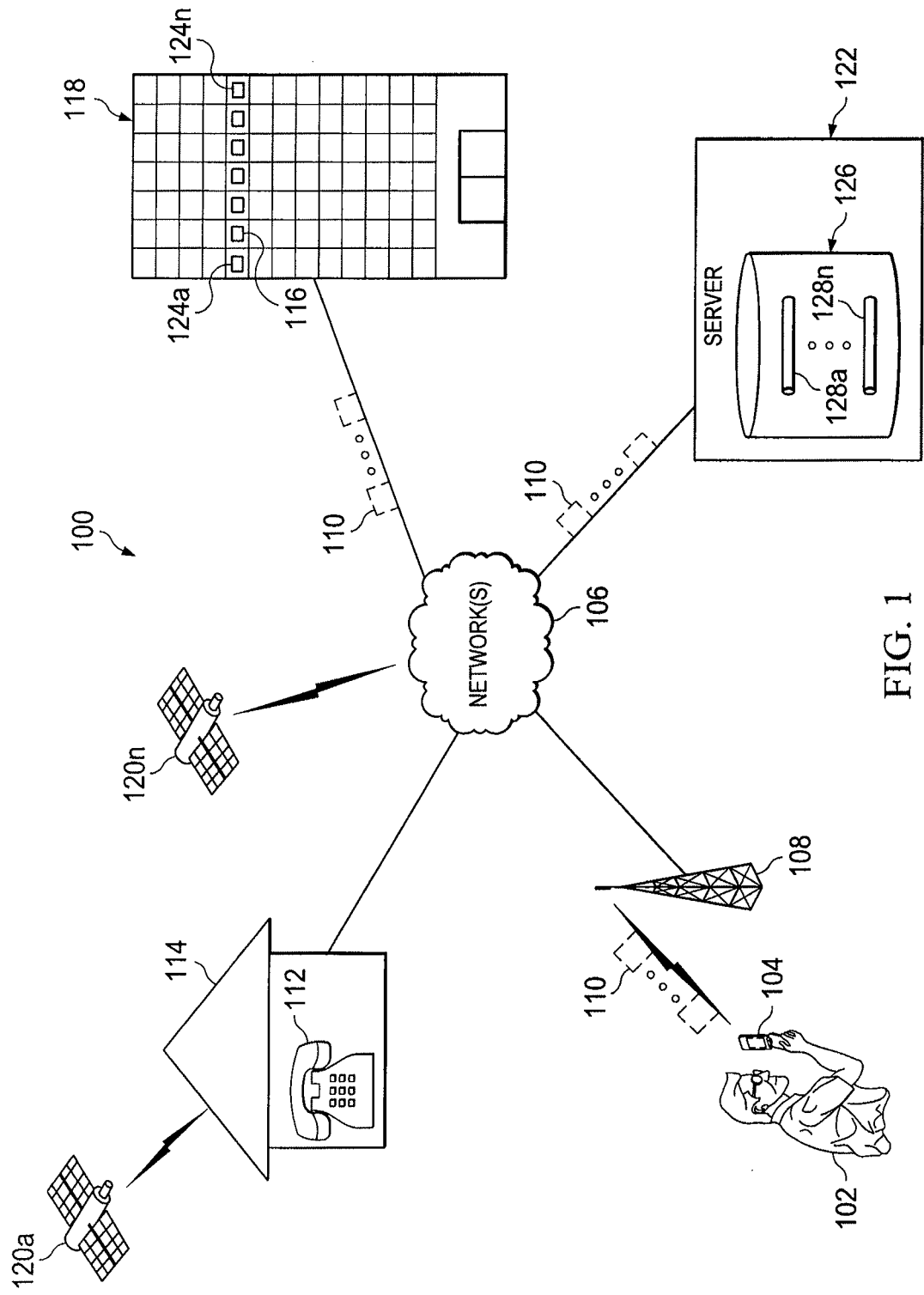
FIG. 1 is an illustration of an exemplary environment for providing telecommunications services including call forwarding in accordance with the principles of the present invention.

With regard to FIG. 1, a user 102 is shown with a wireless device 104. The wireless device 104 may be a mobile telephone that communications over a mobile network, voice over Internet Protocol (VoIP) telephone, smart telephone (e.g., Blackberry®), or any other wireless device that is generally utilized by the user 102. The wireless device 104 may be in communication with communications network(s) 106 via a mobile communications tower 108. In one embodiment, the wireless device 104 may communicate utilizing data packets 110 utilizing any wireless communications protocol, as understood in the art.

The user 102 may have one or more telephones assigned to him or her. A telephone being assigned to a user means that the user is a primary subscriber or resident where the telephone is located. The user may or may not have his or her name specifically identified on a bill, but the telephone is one in which the user typically receives calls (e.g., teenager whose parents pay bills on a home telephone). The assigned telephone may be a fixed-position telephone (e.g., wall telephone or wired telephone that connects to a socket) or cordless telephone having a base unit and wireless handset. For example, the user 102 may have a home telephone 112 located as his or her house 114 and a work telephone 116 as his or her office 118.

The wireless device 104 may be configured to determine or be utilized in determining location information. For example, the wireless device 104 may be configured with a global positioning system (GPS) device that is able to identify location coordinates from GPS satellites 120a-120n. As another example, a mobile communications system may utilize triangulation techniques for determining location of the wireless device 104. It should be understood that GPS coordinates may be but one location coordinate system and that alternative location coordinates may be utilized to identify location of the wireless device 104.

A server 122 may be in communication with the network(s) 106 and utilized to enable the user 102 to register telephone information of the telephones 112 and 116 that are assigned to the user 102. In addition, because the user 102 is likely to be in other offices or locations at his or her office 118, each work telephone 124a-124n (collectively 124) may also be registered with the server 122 and assigned to an organization (e.g., company) of which the user is associated. Telephone 116, as shown, is one of the work telephones 124, which define a set of telephones. A storage unit 126 may be configured to store one or more data repositories 128a-128n (collectively 128) with telephone information for the telephones assigned to the user and assigned to the organization, respectively. In being associated with the organization, the user 102 may be an employee, officer, board member, sales person who sells products or services to the organization, consultant for the organization, or have any other function that would associate the user 102 with the organization. It should be understood that the organization may include one or more locations (e.g., located in the same or different cities, states, or countries) and each telephone within the organization may be separately identified with a set of location coordinates (e.g., latitude, longitude and altitude coordinates).

In one embodiment, the server 122 may be configured to determine whether the wireless telephone 104 is within a predetermined distance (e.g., 10 feet) from a telephone registered to be either assigned to the user 102 or organization of which the user 102 is associated and forward a call to a telephone that is within the predetermined distance. For example, if the user 102 has enabled a call forward feature (e.g., "find me follow me" feature) provided by a service provider of the wireless device 104, then the server 122 may determine that the wireless device 104 is within the predetermined distance of one of the registered telephones (e.g., home telephone 112 or work telephone 124n), and route calls made to the wireless device 104 to the registered telephone within the predetermined distance.

To assist the user 104 in identifying that the forwarded call is for the user 104, a distinctive ring may be generated at the telephone. A distinctive ring may be any ring time that distinguishes a call forwarding from a direct call. For example, a distinctive ring would include a triple ring having three short burst rings or any other ring (e.g., short-long-short rings) that would notify the user 102 that a forwarded call is being made to the user 102. In one embodiment, the distinctive ring may be a non-bell type ring, such as a voice announcement, music, or any other audio sound capable of being created or played by the registered telephone.

Although the wireless device 104 may be configured to communicate over the network(s) 106, the server 122 may be configured to cause a forwarded call to be routed over either data packet (e.g., Internet) or non-data packet (e.g., public switched telephone network (PSTN)) communications networks. While shown as a single server 122, the same or analogous functionality may be provided by more than one server. In addition, the storage unit 126, rather than being located at the server 122, the storage unit 126 may be remotely located from the server 122, but in communication with the server 122 via the network(s) 106.

Figure 2:
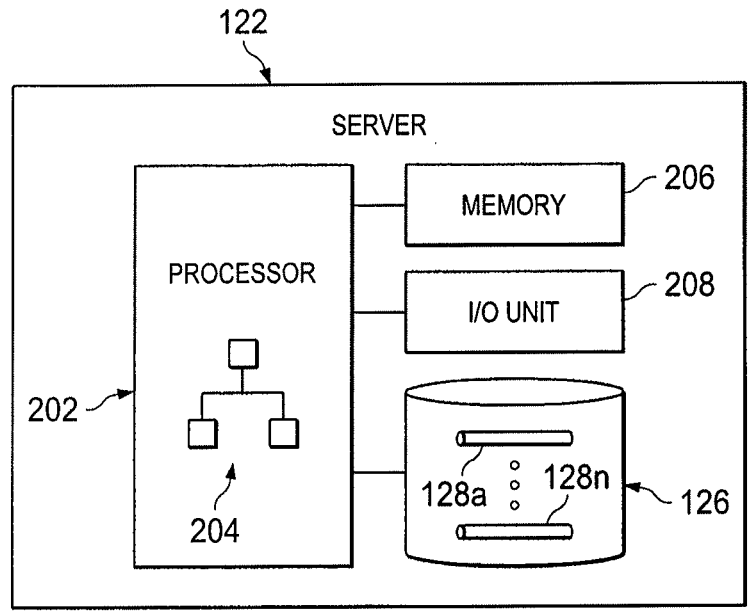
FIG. 2 is a block diagram of an exemplary server for providing functionality in accordance with the principles of the present invention.

With regard to FIG. 2, the server 122 of FIG. 1 may be configured with a processing unit 202 that executes software 204. The software 204 may be configured to provide call forwarding functionality in accordance with the principles of the present invention. The processing unit 202 may further be in communication with a memory 206, input/output unit 208 and storage unit 126 storing data repositories 128 (FIG. 1). The data repositories 128 may be one or more databases having records defining the telephone information assigned to the user or organization(s) of which the user is associated. The processing unit 202 may be formed of one or more computer processors. The memory 206 may be utilized to store data and executable software. The I/O unit 208 may be configured to communicate over one or more networks using data packet communications protocols or otherwise.

The software 204 may be configured to provide a number of different processes, including registration, data management, and call forwarding. The registration process may enable a user to register telephone information assigned to the user and register telephone information assigned to an organization of which the user is associated. For registration of telephones assigned to the user, the user may interface with the software 204 via a wireless device, as further described with respect to FIG. 4. For registration of the telephones assigned to an organization, a user, who may be an employee of the organization, service provider, or outside agent, may interface with software 204 via a network, such as a website on the Internet, wireless device with GPS or other coordinate generation system, or wireless device configured to a communications system to generate triangulated coordinates, as further described with respect to FIG. 5. The data management process may include storing and accessing telephone information, including location coordinates, of the registered telephones in the data repositories 128. The call forwarding process may include receiving a call request and determining that the wireless device is within a predetermined distance from a registered telephone.

Figure 3:
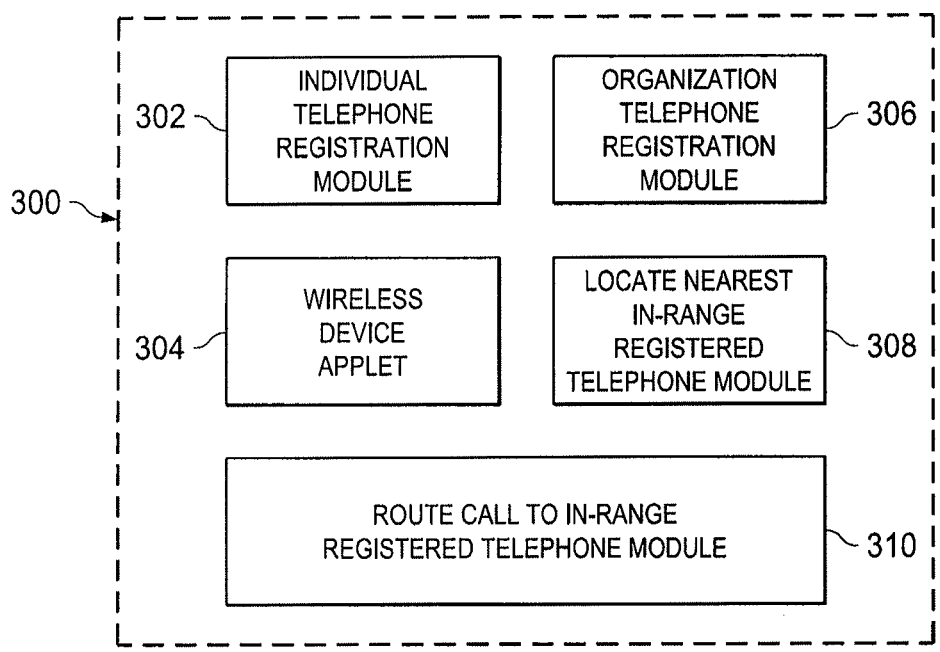
FIG. 3 is a block diagram of exemplary modules executable by the server of FIG. 2.

With regard to FIG. 3, modules 300 are provided to provide for one or more of the processes provided by the software 204 of FIG. 2. An individual telephone registration module 302 may be configured to enable a user to register an individual telephone by submitting telephone information. The telephone information may include telephone number, location (e.g., home or work), and location coordinates. In one embodiment, the location coordinates are GPS coordinates. A wireless device applet 304 may be an application that is downloadable to a wireless device for execution thereon. The wireless device applet 304 may provide a GUI to enable a user to register a telephone by entering telephone information. As the wireless device may have GPS electronics to determine GPS coordinates, the wireless device applet 304 may automatically collect the GPS coordinates from the wireless device when a user is registering a telephone. The individual telephone registration module 302 may be accessible via a network, telecommunications and/or Internet, via a wireless device, computer, or otherwise, to enable a user to enter the telephone information, while the wireless device applet 304 may allow the user to enter the telephone information via the wireless device. In one embodiment, the individual telephone registration module 302 may interact with the wireless device applet 304, whereby the individual telephone registration module 302 collects the telephone information that is submitted by the wireless device applet 304. An exemplary GUI of the wireless device applet 304 is shown in FIG. 4.

An organization telephone registration module 306 may provide a GUI for a user to register one or more telephones of an organization. The organization telephone registration module 306 may provide a GUI accessible via a network, such as the Internet. The user may be asked to submit or select an organization identifier. For example, a company, such as Raytheon Company, may have a pre-established identifier that may be selected from a list of companies via the GUI. A subset of the selected organization may also be selectable. As some organizations have more than one affiliate or location, each may be selectable or enterable. For example, Raytheon Company has many buildings in Massachusetts, Arizona, Tennessee, Texas, etc. In addition, Raytheon Company owns other companies and divisions under the same and different names. The organization telephone registration module 306 may enable a user to enter telephone information of each telephone in the organization. An exemplary GUI of the organization telephone registration module 306 is shown in FIG. 5. By registering some or all of the telephones of an organization, an employee that travels throughout the organization may be reached when at his or her location or traveling to other locations within the organization.

A locate nearest in-range registered telephone module 308 may be configured to enable the server 122 or other system to locate a registered telephone that is within a predetermined distance or range of a wireless telephone of a user. The module 308 may receive GPS or other coordinates of the wireless telephone and look-up a registered telephone that is positioned with the predetermined distance (e.g., 10 feet). Other coordinate systems that provide for a resolution the same or similar to that of the GPS coordinate system may be utilized in accordance with the principles of the present invention. A route call to in-range registered telephone module 310 may receive telephone information identified by the locate nearest in-range registered telephone module 308 and automatically route a call to the telephone identified to be within the predetermined distance.

Figure 4:
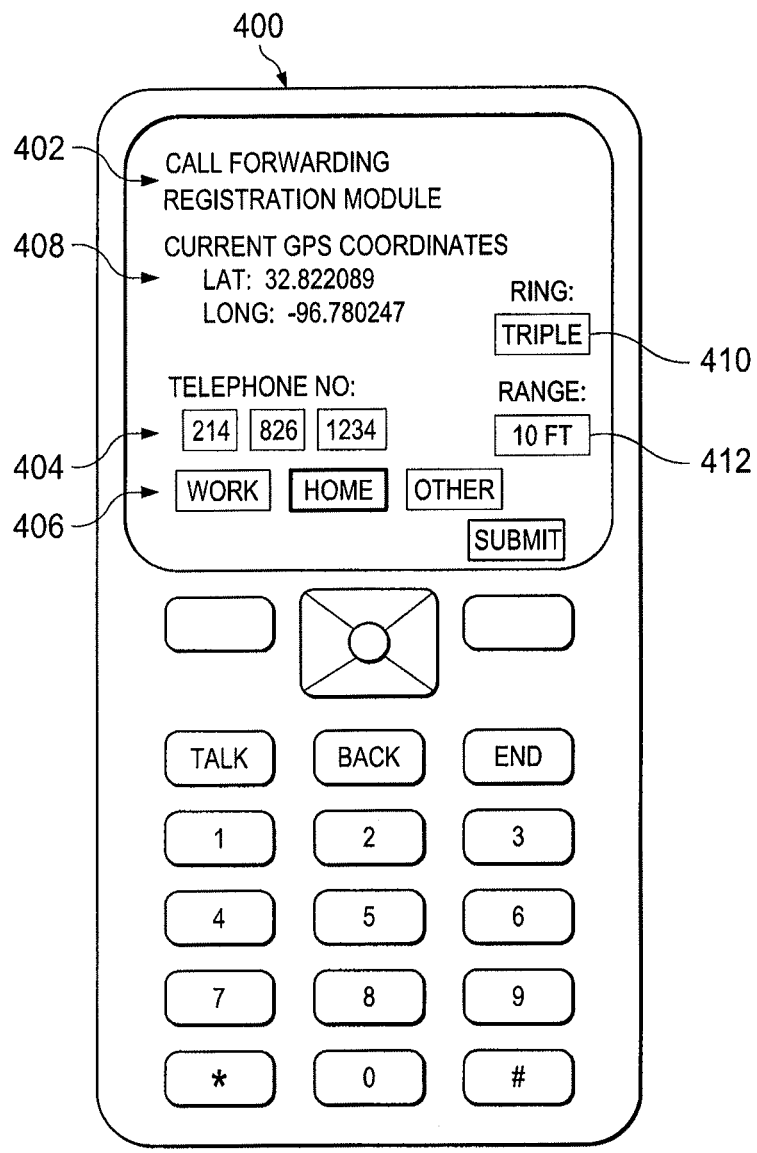
FIG. 4 is an illustration of an exemplary wireless device providing a user interface for a user to identify and enter telephone information and location coordinates thereof.

With regard to FIG. 4, a wireless device 400 may execute software, such as the wireless device applet 304, to display a GUI 402 that enables a user to register a telephone by entering a telephone number in text entry field(s) 404. In addition, the GUI 402 may enable a user to select an identifier 406, such as "work," "home," or "other." As shown, current GPS coordinates 408 may be displayed such that when the user submits the telephone number and, optionally, identifier, the telephone information (e.g., telephone number, identifier, and GPS coordinates), may be stored for later look-up in determining whether the wireless telephone 400 is within a predetermined distance of the registered telephone. In one embodiment, the user may be provided an option to select a ring type for a call forwarding ring. As shown, a selection element 410 may enable a user to select from among a number of different ring types, such as triple ring. Alternative ring types and tones may be selectable by the user in accordance with the principles of the present invention.

With regard to FIG. 5, an exemplary GUI 500 is shown to enable one or more telephones of an organization to be registered. In one embodiment, the GUI 500 is a website accessible via the Internet or wireless device. The GUI 500 may enable a user to select an organization name, such as Raytheon, via a selectable pull-down menu 502. Alternative GUI elements, such as search text boxes, may be utilized to search for an organization, if available, in a database of organizations located in a storage unit accessible via a network. If the organization is not found in the database, then the user may have the option to add the organization, including name, address, affiliates, etc. A company ID field 504 may display a company ID, which may be a federal ID, employer ID of the company, customer ID, or other ID to distinguish each company.

A table 506 may display telephone information. The telephone information may include telephone number, GPS latitude, GPS longitude, GPS altitude (not shown), name of employee assigned to the telephone, and office number. In one embodiment, telephone information may be entered into each field by a user. Alternatively, the telephone number, name, and office number may be entered by a user and the GPS coordinates may be automatically identified by a wireless device or GPS enabled computer that a user is using while at a telephone being registered. Alternative means of entering the telephone information may be utilized in accordance with the principles of the present invention. For example, a telephone being registered may have a GPS device and be capable of reporting its current GPS coordinates. As another example, a user may use non-GPS enabled devices to register a telephone and perform a look-up on an on-line system that provides GPS coordinates for the location at which the telephone resides (e.g., house). As shown, each row in table 506 defines a data record of telephone information. The first three data records 508 include telephone information associated with telephones located in Massachusetts, and the last three data records 510 include telephone information associated with telephones located in Arizona, each of which are located in facilities owned by Raytheon Company. The user, who may be a representative of the company, employee of a telephone service provider, or otherwise, may select a distinctive ring, such as a short-long ring, from a selection element 512 that provides users with a notification that a call forwarding call is being made to a telephone at which he or she is located.

TABLES I-III may include exemplary information stored in data repositories for use in managing telephone information to provide for call forwarding functionality in accordance with the principles of the present invention. TABLE I includes a list of subscribers and telephone information of telephones assigned to each subscriber. In addition, organization or company information may be associated with each subscriber. TABLE II may include organization information, including company name, company ID address, telephone number (main line), and contact name of individual who manages the organization information and telephone information in TABLE III. TABLE III may include telephone information of each telephone within the organization. TABLE III may include telephone number, name assigned to telephone (e.g., employee), office (or cubicle) number, GPS latitude, GPS longitude, and GPS altitude (not shown). Other relevant information associated with the telephone, such as telephone brand and model, may also be stored. As organizations may be extensive and include many thousands of telephones, TABLES I-III are exemplary and it should be understood that each organization may have a separate table or database to manage telephone information. In addition, the TABLES are relational in that TABLE I includes a company name and ID and either may be used to access information stored in either TABLES II or III. Alternative database configurations may be utilized in accordance with the principles of the present invention.

With regard to FIG. 6, an exemplary process 600 is shown. The process 600 may start at step 602, where telephone information, including location coordinates, of a first set of telephones assigned to a user may be stored. The first set of telephones assigned to the user may include a user's home, work, and other telephones. At step 604, telephone information, including location coordinates, of a second set of telephones assigned to an organization of which the user is associated may be stored. The telephones assigned to the organization may include one or more telephones that are also assigned to the user, who may be an employee of the organization. The user may be associated with the organization by being an employee, consultant, officer, director, or otherwise. The stored telephone information of telephones assigned to the user and organization may be stored in the same or different data repositories and may be co-located or located remotely from one another on the same or different network.

At step 606, a call request may be received. The call request may be a call that is being placed to the user. A determination may be made at step 607 as to whether the user has call forwarding activated. If so, at step 608, a determination is made as to whether the wireless telephone of the user is within a predetermined range of a telephone in a first set of telephones. The first set of telephones may include telephones assigned to the user (e.g., home telephone, work telephone,

TABLE I

| Subscriber | Wireless Device | Home | GPS Coords | Work | GPS Coords | Other | GPS Coords | Company Name | Company ID |
|---|---|---|---|---|---|---|---|---|---|
| Bob Smith | 978 405-1234 | 978 826-0123 | Lat: 27.729523 Long: −92.352903 | 978 259-1234 | Lat: 42.616759 Long: −71.216168 | — | — | Raytheon Company | 3294718 |
| Mark Johnson | 603 966-1234 | 603 741-2345 | Lat: 46.196773 Long: 11.474652 | 978-259-5678 | Lat: 42.616758 Long: −71.216169 | — | — | Fidelity Investments | 7243823 |
| Laurie Farrell | 214 374-9876 | 972 873-1234 | Lat: 32.924701 Long: −96.743821 | 972 483-1234 | Lat: 32.552471 Long: −96.342103 | — | — | Pizza Hut | 3472813 |
| ... | ... | ... | ... | ... | ... | ... | ... | ... | ... |

TABLE II

| Company Name | Company ID | Address | Telephone Number | Contact Name |
|---|---|---|---|---|
| Raytheon Company | 3294718 | 34 Tewksbury Dr. Tewksbury, MA 01876 | 978 858-3000 | Steve Brower |
| Fidelity Investments | 7243823 | 82 Devonshire St. Boston, MA 02109 | 617 276-5000 | Bob Smith |
| Pizza Hut | 3472813 | 743 Midway Rd. Addison, TX 75102 | 972 743-1400 | Beth Collins |
| ... | ... | ... | ... | ... |

TABLE III

| Raytheon Company 3294718 | | | | |
|---|---|---|---|---|
| Telephone Number | Name | Office | GPS Lat. | GPS Long. |
| 978 858-4234 | Tom Malay | 7483 | 27.729525 | −92.352903 |
| 978 858-4235 | Cheryl Moore | 7484 | 27.729526 | −92.352903 |
| 978 858-4237 | Tim McNabb | 7485 | 27.729527 | −92.352904 |
| ... | ... | ... | ... | ... | etc.). If so, then at step 610, a call associated the call requested may be routed or caused to be routed to the telephone in the first set of telephones. At step 612, a determination may be made as to whether the call is answered at the telephone. If the call is answered, the call is connected at step 614.

If either the call is not answered at step 612 or the wireless telephone of the user is not within a predetermined range of the telephone in the first set of telephones at step 608, then the process 600 continues at step 616. At step 616, a determination is made as to whether the wireless telephone of the user is within a predetermined range of a telephone in a second set of telephones. The second set of telephones may be telephones assigned to an organization, such as an employer, of which the user is associated. If so, then the process 600 continues at step 618, where a call associated with the call request may be routed or caused to be routed to a telephone of the second set of telephones at step 618. At step 620, a determination is made as to whether the call was answered at the telephone. If so, the call is connected to the telephone at step 622. Otherwise, if the call is not answered at the telephone in the second set of telephones or a determination was made that the wireless telephone of the user is not within the predetermined range of a telephone in the second set of telephones, then the call is connected to the user's voicemail at step 624.

If call forwarding is determined not to be activated at step 607, then the process 600 may continue at step 626, where the call is routed to the wireless device. If the call is answered at step 628, then the call is connected at step 630. If not, then the call may be connected to voicemail. In one embodiment, a setting may allow for an unanswered call at step 628 to be call forwarded using the process 600 starting at step 608 (i.e., continuing at step 608 from step 628) prior to the call being connected to voicemail, which is performed at step 624 should the call forwarding process be unsuccessful. It should be understood that alternative processes that provide the same or analogous functionality as provided herein may be utilized in accordance with the principles of the present invention. It should also be understood that the storage of the telephone information may be performed by the same or different service providers.

Although the principles of the present invention have been described in terms of the foregoing embodiments, this description has been provided by way of explanation only, and is not intended to be construed as a limitation of the invention. Those skilled in the art will recognize modifications of the present invention that might accommodate recording one-way speech signal samples.

We claim:

1. A method for providing communication services, said method comprising:
   storing, in a data storage unit, a set of location coordinates corresponding to a set of communication devices;
   associating, using a processor, the set of communication devices with a communication device of a user;
   determining, using the processor, a location of the communication device in response to receiving a call request to the communication device;
   determining a closest communication device in the set of communication devices to the location of the communication device; and
   routing the call request to the closest communication device in the set of communication devices.

2. The method according to claim 1, further comprising:
   determining whether the closest communication device in the set of communication devices is within a predetermined range of the communication device at a time of receiving the call request to the communication device; and
   wherein routing the call request to the closest communication device in the set of communication devices is performed only in response to a determination that the closest communication device in the set of communication devices is within the predetermined range of the communication device at the time of receiving the call request to the communication device.

3. The method according to claim 1, further comprising receiving a user-selection selecting the set of communication devices from a list of previously stored sets of communication devices.

4. The method according to claim 3, further comprising providing a graphical user interface for enabling the user to search for an organization, wherein each of the list of previously stored sets of communication devices includes at least one communication device number and associated set of location coordinates associated with at least one communication device of the organization.

5. The method according to claim 1, further comprising causing the call associated with the call request to be routed to the communication device in response to a determination that the closest communication device in the set of communication devices is not answered or busy.

6. The method according to claim 2, further comprising causing the call associated with the call request to be routed to the communication device in response to a determination that the communication device is not located within the predetermined range of the closest communication device in the set of communication devices.

7. The method according to claim 2, wherein the predetermined range associated with each communication device of the set of communication devices is the same for each communication device of the set of communication devices.

8. The method according to claim 1, further comprising generating a distinctive call forwarded ring on the closest communication device in the set of communication devices, the distinctive call forwarded ring indicating to the user that the call request has been routed from the communication device to the closest communication device in the set of communication devices.

9. The method according to claim 8, further comprising enabling the user to select the distinctive call forwarded ring.

10. A system for providing communication services, said system comprising:
    a data storage unit that stores a set of location coordinates corresponding to a set of communication devices;
    memory that stores executable instructions;
    a processor that executes the executable instructions to:
        associate the set of communication devices with a communication device of a user;
        determine a location of the communication device in response to receiving a call request to the communication device;
        determine a closest communication device in the set of communication devices to the location of the communication device; and
        route the call request to the closest communication device in the set of communication devices.

11. The system according to claim 10, wherein the processor further executes the executable instructions to:
    determine whether the closest communication device in the set of communication devices is within a predetermined range of the communication device at a time of receiving the call request to the communication device; and
    wherein routing the call request to the closest communication device in the set of communication devices is performed only in response to a determination that the closest communication device in the set of communication devices is within the predetermined range of the communication device at the time of receiving the call request to the communication device.

12. The system according to claim 10, wherein the processor further executes the executable instructions to receive a user-input selecting the set of communication devices from a list of previously stored sets of communication devices.

13. The system according to claim 12, wherein the processor further executes the executable instructions to generate a graphical user interface for enabling the user to search for an organization, wherein each of the list of previously stored sets of communication devices includes at least one communication device number and associated set of location coordinates associated with at least one communication device of the organization.

14. The system according to claim 10, wherein the processor further executes the executable instructions to route the call to the communication device in response to a determination that the closest communication device in the set of communication devices is not answered or busy.

15. The system according to claim 11, wherein the processor further executes the executable instructions to route the call to the communication device in response to a determination that the communication device is not located within the predetermined range of the closest communication device in the set of communication devices.

16. The system according to claim 11, wherein the predetermined range associated with each communication device of the set of communication devices is configurable for each communication device of the set of communication devices.

17. The system according to claim 10, wherein the processor further executes the executable instructions to generate a distinctive call forwarded ring on the closest communication device in the set of communication devices, the distinctive call forwarded ring indicating to the user that the call request has been routed from the communication device to the closest communication device in the set of communication devices.

18. The system according to claim 17, wherein the processor further executes the executable instructions to enable the user to select the distinctive call forwarded ring.

19. A non-transitory, tangible computer readable medium comprising executable instructions for:
  associating a set of communication devices with a user;
  determining a location of the user in response to receiving a call request to the user;
  determining a closest communication device in the set of communication devices to the location of the user;
  determining whether the closest communication device in the set of communication devices is within a predetermined range of the user at a time of receiving the call request to the communication device; and
  routing the call request to the closest communication device in the set of communication devices;
  wherein routing the call request to the closest communication device in the set of communication devices is performed only in response to a determination that the closest communication device in the set of communication devices is within the predetermined range of the user at the time of receiving the call request.

* * * * *